(12) United States Patent
Kato

(10) Patent No.: US 11,469,045 B2
(45) Date of Patent: Oct. 11, 2022

(54) CERAMIC ELECTRONIC COMPONENT AND METHOD OF MANUFACTURING THE SAME

(71) Applicant: TAIYO YUDEN CO., LTD., Tokyo (JP)

(72) Inventor: Yoichi Kato, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 17/167,965

(22) Filed: Feb. 4, 2021

(65) Prior Publication Data

US 2021/0272755 A1 Sep. 2, 2021

(30) Foreign Application Priority Data

Feb. 28, 2020 (JP) .............................. JP2020-032929

(51) Int. Cl.
*H01G 4/12* (2006.01)
*H01G 4/30* (2006.01)
*H01G 13/00* (2013.01)

(52) U.S. Cl.
CPC ............. *H01G 4/1227* (2013.01); *H01G 4/30* (2013.01); *H01G 13/00* (2013.01)

(58) Field of Classification Search
None
See application file for complete search history.

(56) References Cited

U.S. PATENT DOCUMENTS

| | | | |
|---|---|---|---|
| 2012/0234462 A1 | 9/2012 | Matsui et al. | |
| 2013/0222972 A1* | 8/2013 | Saito | H01G 4/005 361/301.4 |
| 2015/0049413 A1* | 2/2015 | Wada | H01G 4/012 361/301.4 |
| 2018/0261389 A1* | 9/2018 | Sakate | H01G 4/248 |
| 2019/0355519 A1* | 11/2019 | Taniguchi | H01G 4/228 |
| 2019/0371528 A1* | 12/2019 | Takashima | H01G 4/228 |
| 2020/0402719 A1* | 12/2020 | Sugawara | H01G 4/248 |
| 2021/0134527 A1* | 5/2021 | Ogawa | H01G 4/30 |

FOREIGN PATENT DOCUMENTS

| JP | 2012209539 A | 10/2012 |
|---|---|---|
| JP | 2017011172 A | 1/2017 |

* cited by examiner

*Primary Examiner* — Dion R. Ferguson
(74) *Attorney, Agent, or Firm* — Law Office of Katsuhiro Arai

(57) ABSTRACT

A ceramic electronic component includes a multilayer structure including dielectric layers and internal electrode layers, the internal electrode layers being alternately exposed to two edge faces of the multilayer chip opposite to each other. A rare earth element of a side margin has an ionic radius smaller than that of a rare earth element of a capacity section. The rare earth element of the side margin is a rare earth element when only the rare earth element is added to the side margin, or a rare earth element with a largest amount when rare earth elements are added to the side margin. The rare earth element of the capacity section is a rare earth element when only the rare earth element is added to the capacity section, or a rare earth element with a largest amount when rare earth elements are added to the capacity section.

10 Claims, 11 Drawing Sheets

CERAMIC ELECTRONIC COMPONENT AND METHOD OF MANUFACTURING THE SAME

CROSS-REFERENCE TO RELATED APPLICATION

This application is based upon and claims the benefit of priority of the prior Japanese Patent Application No. 2020-032929, filed on Feb. 28, 2020, the entire contents of which are incorporated herein by reference.

FIELD

A certain aspect of the present disclosure relates to a ceramic electronic component and a method of manufacturing the same.

BACKGROUND

Ceramic electronic devices such as multilayer ceramic capacitors have a capacity section in which internal electrode layers are stacked through a dielectric layer, and a side margin protecting side portions of the internal electrode layers (for example, see Japanese Patent Application Publication No. 2012-209539). For example, a common rare earth element is added to the capacity section and the side margin. Thus, uneven distribution of each element during a firing process is suppressed, and reliability is improved because of adding of the rare earth element (for example, see Japanese Patent Application Publication No. 2017-011172).

SUMMARY OF THE INVENTION

However, in ceramics electronic devices having a large lamination density, sintering velocity is larger in the capacity section than in the side margin. For example, this is because removing of a binder is delayed in the capacity section, and during the firing process, an atmosphere in the capacity section is more reductive than in the side margin. When the sintering of the side margin is delayed, densifying of the side margin is not promoted. Thus, reliability such as lifetime characteristic or resistance to humidity at a high temperature may be degraded.

The present invention has a purpose of providing a ceramic electronic component and a method of manufacturing the same that are capable of improving reliability.

According to a first aspect of the embodiments, there is provided a ceramic electronic component including: a multilayer structure having a substantially rectangular parallelepiped shape and including dielectric layers and internal electrode layers that are alternately stacked, the dielectric layers being mainly composed of ceramic, the internal electrode layers being alternately exposed to two edge faces of the multilayer chip opposite to each other, wherein a rare earth element of a side margin has an ionic radius smaller than an ionic radius of a rare earth element of a capacity section, wherein the rare earth element of the side margin is a rare earth element when only the rare earth element is added to the side margin, or a rare earth element with a largest amount when a plurality of rare earth elements are added to the side margin, wherein the rare earth element of the capacity section is a rare earth element when only the rare earth element is added to the capacity section, or a rare earth element with a largest amount when a plurality of rare earth elements are added to the capacity section, wherein the side margin is a section covering edge portions to which the internal electrode layers extend toward two side faces other than the two edge faces, wherein the capacity section is a section in which the internal electrode layers next to each other are exposed to different edge faces of the multilayer structure.

According to a second aspect of the embodiments, there is provided a method of manufacturing a ceramic electronic component, the method including: preparing a ceramic multilayer structure including a multilayer portion and a side margin section, the multilayer portion having a structure in which sheets including particles of which a main component is ceramic and patterns of metal conductive paste are alternately stacked so that the metal conductive paste is alternately exposed to two edge faces of the multilayer portion, the side margin section being arranged on two side faces of the multilayer portion; and firing the ceramic multilayer structure, wherein a rare earth element of the side margin section has an ionic radius smaller than an ionic radius of a rare earth element of the multilayer portion, wherein the rare earth element of the side margin section is a rare earth element when only the rare earth element is added to the side margin section, or a rare earth element with a largest amount when a plurality of rare earth elements are added to the side margin section, wherein the rare earth element of the multilayer portion is a rare earth element when only the rare earth element is added to the multilayer portion, or a rare earth element with a largest amount when a plurality of rare earth elements are added to the multilayer portion.

DETAILED DESCRIPTION

Hereinafter, an exemplary embodiment will be described with reference to the accompanying drawings.

Exemplary Embodiment

Figure 1:
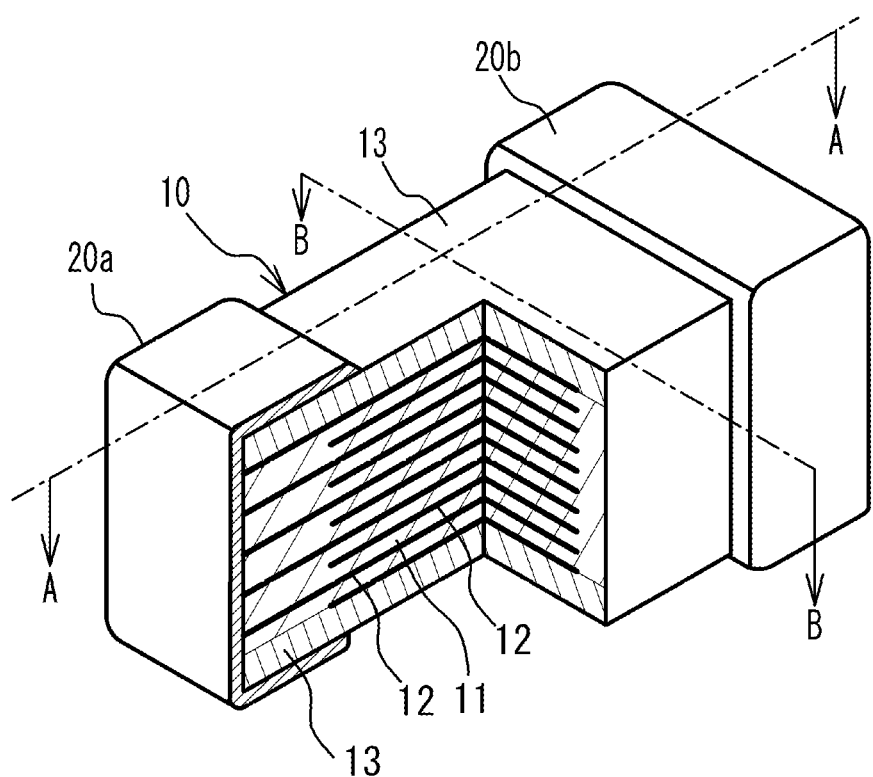
FIG. 1 is a partial cross-sectional perspective view of a multilayer ceramic capacitor.
Figure 2:
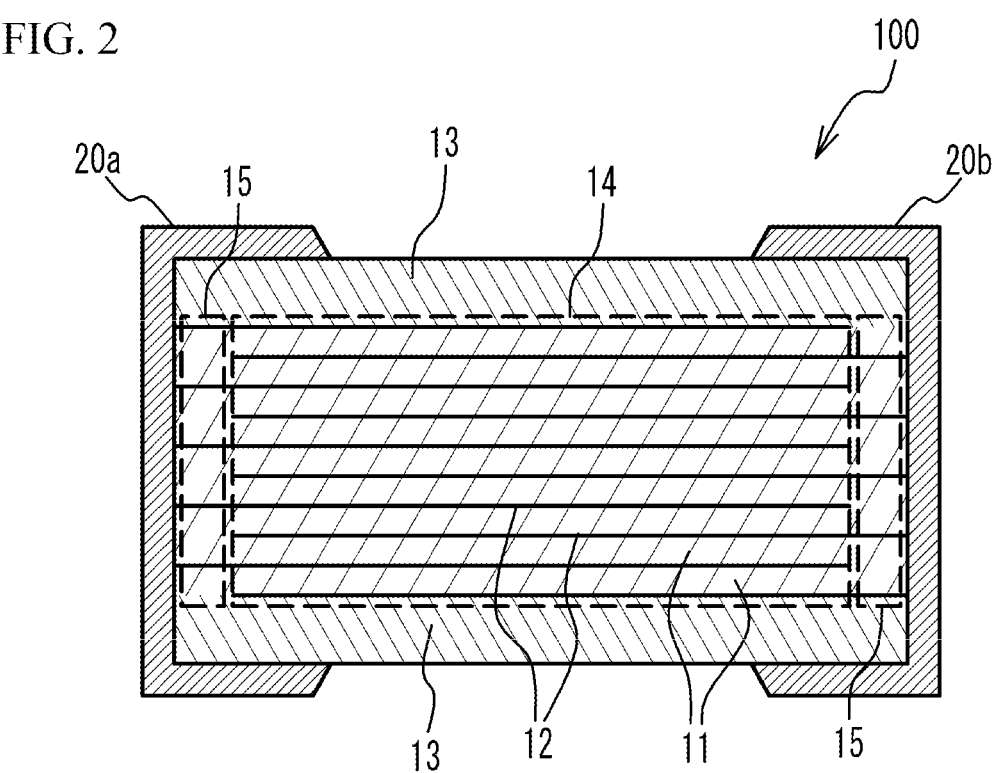
FIG. 2 is a cross-sectional view taken along line A-A in FIG. 1.
Figure 3:
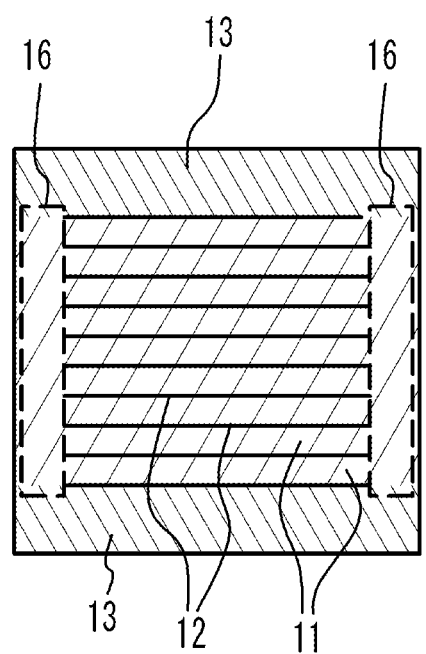
FIG. 3 is a cross-sectional view taken along line B-B in FIG. 1.

FIG. 1 is a partial cross-section perspective views of a multilayer ceramic capacitor 100 in accordance with an exemplary embodiment. FIG. 2 is a cross-sectional view taken along line A-A in FIG. 1. FIG. 3 is a cross-sectional view taken along line B-B in FIG. 1. As illustrated in FIG. 1 to FIG. 3, the multilayer ceramic capacitor 100 includes a multilayer chip 10 having a rectangular parallelepiped shape, and external electrodes 20a and 20b that are respectively provided on two edge faces of the multilayer chip 10 facing each other. Among four faces other than the two edge faces of the multilayer chip 10, two faces other than the top face and the bottom face in the stack direction are referred to as side faces. Each of the external electrodes 20a and 20b extends to the top face and the bottom face in the stack direction and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 contains a ceramic material acting as a dielectric material. End edges of the internal electrode layers 12 are alternately exposed to a first edge face of the multilayer chip 10 and a second edge face of the multilayer chip 10 that is different from the first edge face. The external electrode 20a is provided on the first edge face. The external electrode 20b is provided on the second edge face. Thus, the internal electrode layers 12 are alternately electrically connected to the external electrode 20a and the external electrode 20b. Accordingly, the multilayer ceramic capacitor 100 has a structure in which a plurality of the dielectric layers 11 is stacked with the internal electrode layers 12 interposed therebetween. In the multilayer structure of the dielectric layers 11 and the internal electrode layers 12, the outermost layers in the stack direction are the internal electrode layers 12, and cover layers 13 cover the top face and the bottom face of the multilayer structure. The cover layer 13 is mainly composed of a ceramic material. For example, the main component of the cover layer 13 is the same as the main component of the dielectric layer 11.

For example, the multilayer ceramic capacitor 100 may have a length of 0.25 mm, a width of 0.125 mm, and a height of 0.125 mm. The multilayer ceramic capacitor 100 may have a length of 0.4 mm, a width of 0.2 mm, and a height of 0.2 mm. The multilayer ceramic capacitor 100 may have a length of 0.6 mm, a width of 0.3 mm, and a height of 0.3 mm. The multilayer ceramic capacitor 100 may have a length of 1.0 mm, a width of 0.5 mm, and a height of 0.5 mm. The multilayer ceramic capacitor 100 may have a length of 3.2 mm, a width of 1.6 mm, and a height of 1.6 mm. The multilayer ceramic capacitor 100 may have a length of 4.5 mm, a width of 3.2 mm, and a height of 2.5 mm. However, the size of the multilayer ceramic capacitor 100 is not limited to the above sizes.

The internal electrode layer 12 is mainly composed of a base metal such as nickel (Ni), copper (Cu), or tin (Sn). The internal electrode layer 12 may be composed of a noble metal such as platinum (Pt), palladium (Pd), silver (Ag), or gold (Au) or alloy including one or more of them. The dielectric layer 11 is mainly composed of a ceramic material having a perovskite structure expressed by a general formula $ABO_3$. The perovskite structure includes $ABO_{3-\alpha}$ having an off-stoichiometric composition. Examples of such a ceramic material include, but are not limited to, barium titanate ($BaTiO_3$), calcium zirconate ($CaZrO_3$), calcium titanate ($CaTiO_3$), strontium titanate ($SrTiO_3$), and $Ba_{1-x-y}Ca_xSr_yT_{1-z}Zr_zO_3$ ($0 \leq x \leq 1$, $0 \leq y \leq 1$, $0 \leq z \leq 1$) having a perovskite structure.

As illustrated in FIG. 2, the section where the internal electrode layer 12 connected to the external electrode 20a faces the internal electrode layer 12 connected to the external electrode 20b is a section where capacity is generated in the multilayer ceramic capacitor 100. Thus, this section is referred to as a capacity section 14. That is, the capacity section 14 is a section where two adjacent internal electrode layers 12 connected to different external electrodes face each other.

The section where the internal electrode layers 12 connected to the external electrode 20a face each other with no internal electrode layer 12 connected to the external electrode 20b interposed therebetween is referred to as an end margin 15. The section where the internal electrode layers 12 connected to the external electrode 20b face each other with no internal electrode layer 12 connected to the external electrode 20a interposed therebetween is also the end margin 15. That is, the end margin 15 is a section where the internal electrode layers 12 connected to one of the external electrodes face each other with no internal electrode layer 12 connected to the other of the external electrodes interposed therebetween. The end margin 15 is a section where no capacity is generated.

As illustrated in FIG. 3, in the multilayer chip 10, the section from each of the two side faces of the multilayer chip 10 to the internal electrode layers 12 is referred to as a side margin 16. That is, the side margin 16 is a section that covers each of the edges, extending toward the respective side faces of the multilayer structure, of the stacked internal electrode layers 12.

Figure 4A:
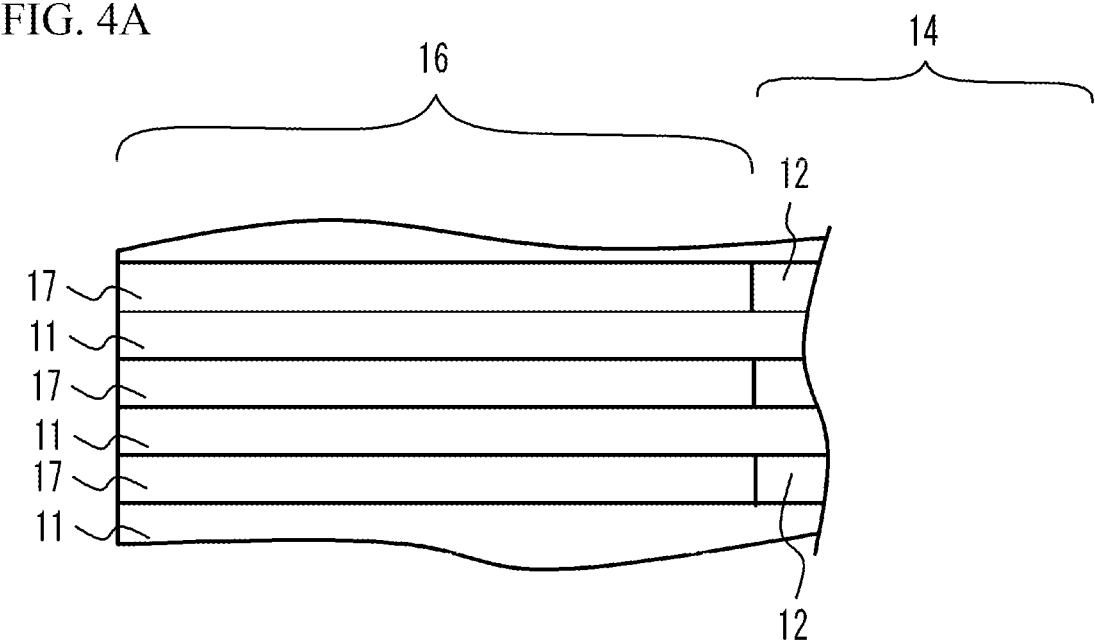
FIG. 4A is an enlarged view of a cross-section of a side margin.
Figure 4B:
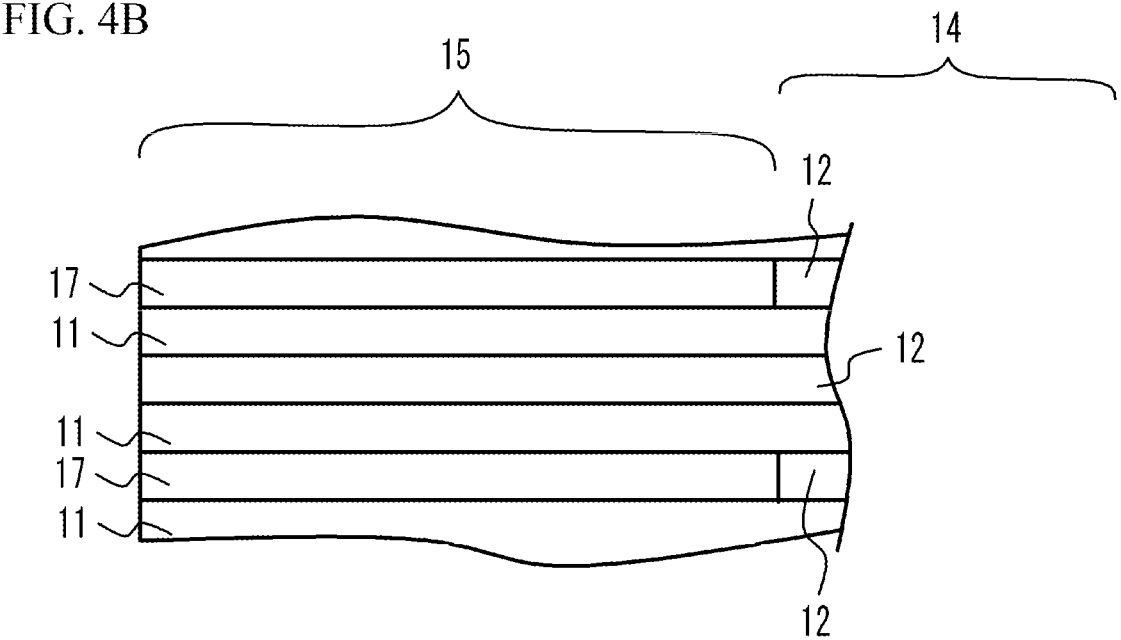
FIG. 4B is an enlarged view of a cross-section of an end margin.

FIG. 4A is an enlarged view of the cross-section of the side margin 16. The side margin 16 has a structure in which the dielectric layers 11 and inverse pattern layers 17 are alternately stacked in the direction (the stack direction) in which the dielectric layers 11 and the internal electrode layers 12 are stacked in the capacity section 14. In FIG. 4A and FIG. 4B, hatching for expressing the cross-section is omitted. Each dielectric layer 11 in the capacity section 14 and the corresponding dielectric layers 11 in the side margins 16 form a continuous layer. This structure reduces the level difference between the capacity section 14 and the side margins 16.

FIG. 4B is an enlarged view of the cross-section of the end margin 15. In comparison with the side margin 16, in the end margin 15, every other internal electrode layer 12 of the stacked internal electrode layers 12 extends to the outer end face of the end margin 15. In addition, in the layers where the internal electrode layers 12 extend to the outer end face of the end margin 15, no inverse pattern layer 17 is stacked. Each dielectric layer 11 in the capacity section 14 and the corresponding dielectric layers 11 in the end margins 15 form a continuous layer. This structure reduces the level difference between the capacity section 14 and the end margins 15.

The capacity section 14 and the side margin 16 are formed by sintering a powder material. It is thought that a common rare earth element is added to the capacity section 14 and the side margin 16, uneven distribution of each element during a firing process is suppressed, and reliability of the multilayer ceramic capacitor 100 is largely improved because of adding of the rare earth element. However, in the multilayer ceramic capacitor 100 having a large lamination density, a sintering velocity is larger in the capacity section 14 than in the side margin 16. For example, this is because removing of a binder is delayed in the capacity section 14, and during the firing process, an atmosphere in the capacity section 14 is more reductive than in the side margin 16. When the sintering of the side margin 16 is delayed, densifying of the side margin 16 is not promoted. Thus, reliability such as lifetime characteristic or resistance to humidity at a high temperature may be degraded.

And so, it is thought that Si (silicon) or a glass component acting as a sintering assistant is added to the side margin 16. The sintering assistant promotes sintering of the side margin 16. However, in the method, diffusion may occur during a firing process, because of a difference between the composition of the capacity section 14 and the composition of the side margin 16. When Si or the glass component acting as the sintering assistant diffuses into the capacity section 14, excessive grain growth or degradation of the dielectric constant may occur. In this case, electrical characteristic of the multilayer ceramic capacitor 100 may be degraded.

And so, it is thought that a rare earth element is added. The rare earth element is added in order to secure the reliability of the multilayer ceramic capacitor 100. The rare earth element improves the reliability of the multilayer ceramic capacitor 100. On the other hand, the rare earth element elevates a sintering completion temperature and delays the sintering. In the following description, function of the rare earth element will be described.

Figure 5:
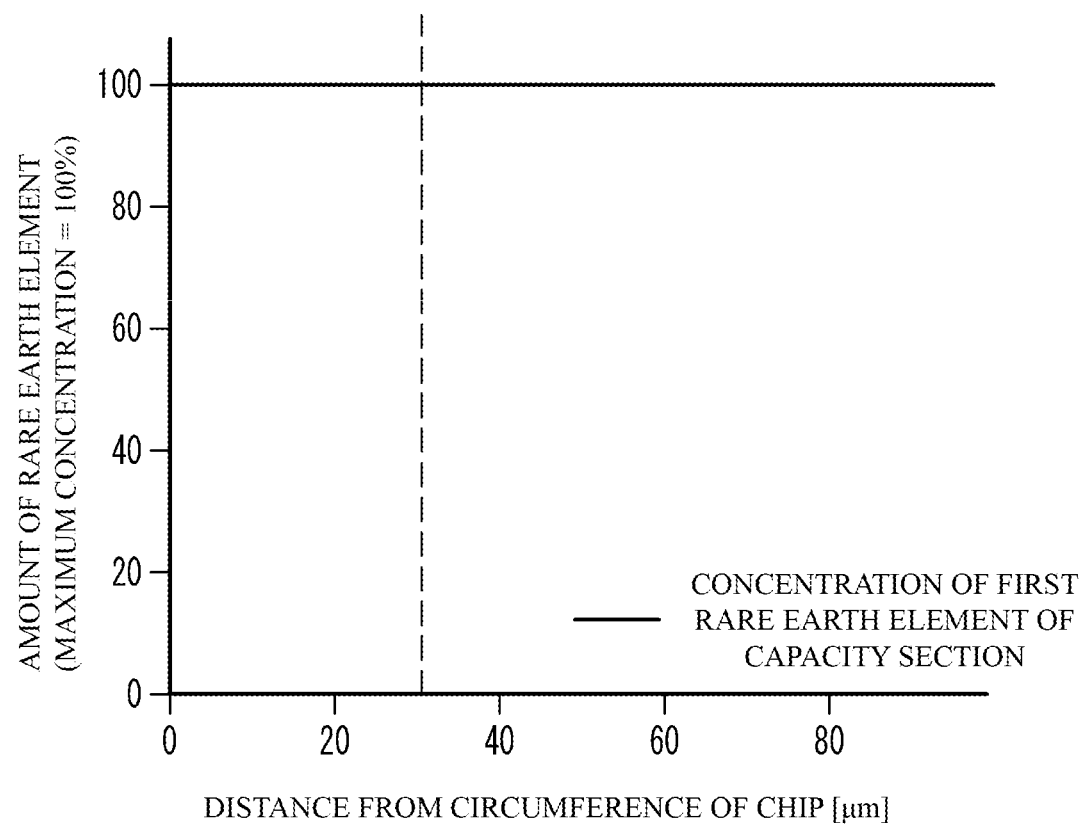
FIG. 5 illustrates a concentrations of a rare earth element of a capacity section and a side margin section.

FIG. 5 illustrates a case where a common rare earth element is added to the capacity section 14 and the side margin 16 so as to obtain an even concentration distribution of the rare earth element. In FIG. 5, a horizontal axis indicates a distance from the side faces (outer circumference) of the multilayer chip 10. That is, the horizontal axis of FIG. 5 indicates a distance from the surface of the side margin 16 toward the capacity section 14. An interface between the side margin 16 and the capacity section 14 is around 30 μm. A vertical axis of FIG. 5 indicates the concentration of the rare earth element and indicates values on a presumption that the maximum concentration of the rare earth element in the capacity section 14 and the side margin 16 is 100%. In FIG. 5, the concentration distribution of the rare earth element is even in the capacity section 14 and the side margin 16. Therefore, the concentration of the rare earth element is 100% at any position. In the structure, as mentioned above, when the atmosphere in the capacity section 14 during the firing process is more reductive than in the side margin 16, densifying of the side margin 16 is delayed and the reliability is degraded.

Figure 6:
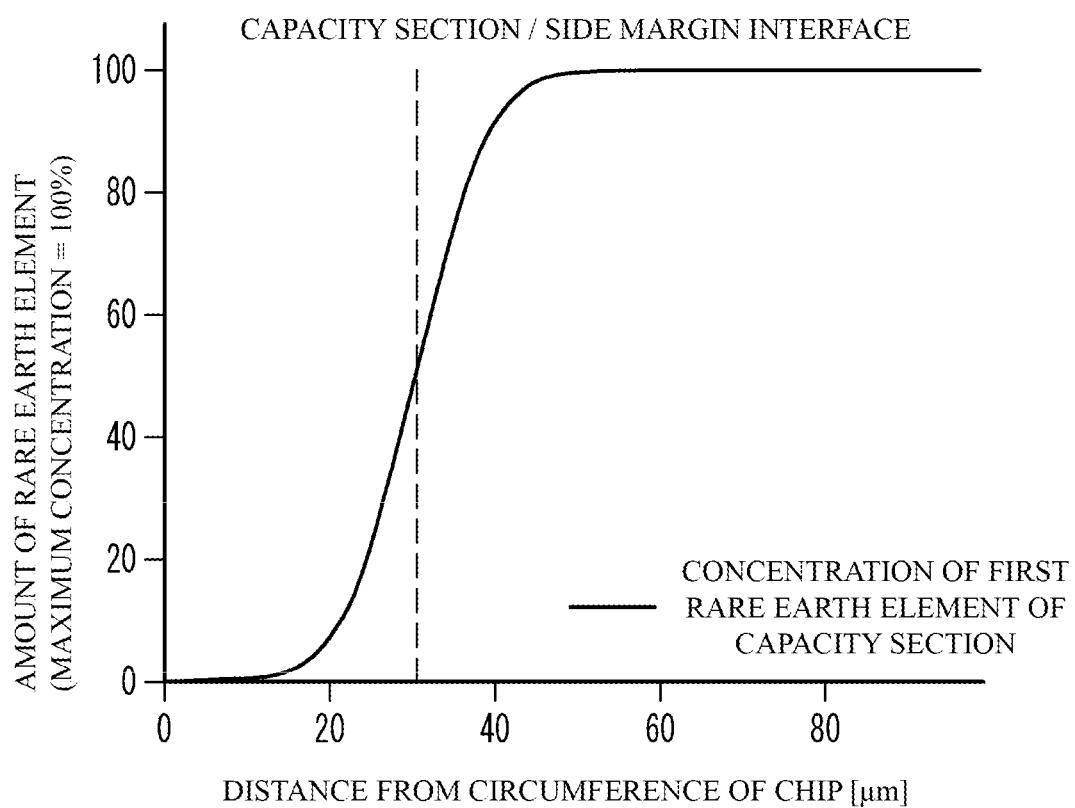
FIG. 6 illustrates a concentrations of a rare earth element of a capacity section and a side margin section.

And so, as illustrated in FIG. 6, it is thought that the amount of the rare earth element added to the capacity section 14 is increased, and the amount of the rare earth element added to the side margin 16 is decreased. In the case of FIG. 6, the amount of the rare earth element is large in the capacity section 14. And, in the vicinity of the interface between the capacity section 14 and the side margin 16, the amount of the rare earth element gradually decreases from the capacity section 14 toward the side margin 16. And, the amount of the rare earth element further decreases toward outside of the side margin 16. In the structure, the delay of the sintering of the side margin 16 is suppressed. However, the amount of the rare earth element is small in the side margin 16. Therefore, the reliability of the multilayer ceramic capacitor 100 may be degraded.

And so, in the embodiment, an ionic radius of the rare earth element is determined. When the ionic radius of the rare earth element is small, an amount of the rare earth element which is solid-solved in the B site becomes larger because the ionic radius of the B site is relatively small. When the ionic radius of the rare earth element is large, an amount of the rare earth element which is solid-solved in the A site becomes larger because the ionic radius of the A site is relatively large. In the $ABO_3$ having the perovskite structure, the diffusion velocity of the A site is larger than the diffusion velocity of the B site because of the crystal structure of the $ABO_3$. Therefore, when the rare earth element having a small ionic radius is added, the sintering is promoted.

When a plurality of types of rare earth elements are added to the capacity section 14, a rare earth element of which the amount is the largest among the rare earth elements is referred to as a first rare earth element of the capacity section 14. When one type of rare earth element is added to the capacity section 14, the rare earth element is the first rare earth element of the capacity section 14.

When a plurality of types of rare earth elements are added to the side margin 16, a rare earth element of which the amount is the largest among the rare earth elements is referred to as a first rare earth element of the side margin 16. When one type of rare earth element is added to the side margin 16, the rare earth element is the first rare earth element of the side margin 16.

Figure 7:
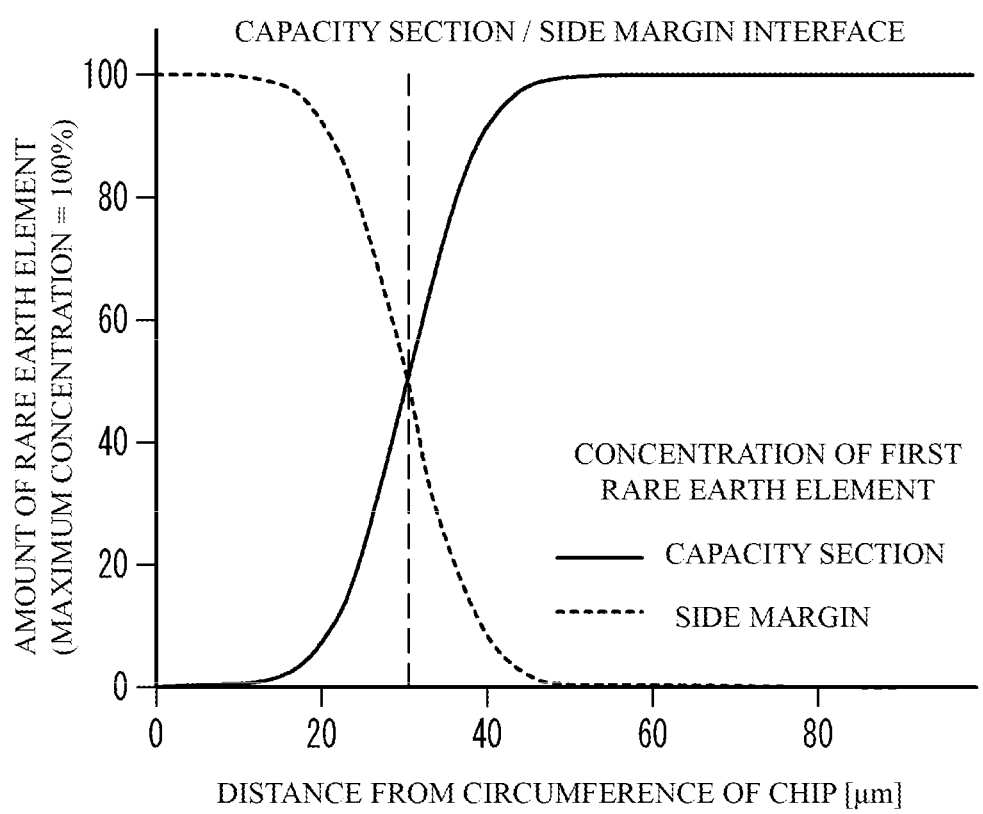
FIG. 7 illustrates concentrations of rare earth elements of a capacity section and a side margin section.

In the embodiment, the ionic radius of the first rare earth element having valence 3 of the side margin 16 is smaller than the ionic radius of the first rare earth element having valence 3 of the capacity section 14. For example, as illustrated in FIG. 7, the concentration of the first rare earth element of the capacity section 14 is large in the capacity section 14. In the vicinity of the interface between the capacity section 14 and the side margin 16, the concentration of the first rare earth element of the capacity section 14 decreases from the capacity section 14 toward the side margin 16 and further decreases toward outside of the side margin 16. The concentration of the first rare earth element of the side margin 16 is large in the side margin 16. In the vicinity of the interface between the capacity section 14 and the side margin 16, the concentration of the first rare earth element of the side margin 16 decreases from the side margin 16 toward the capacity section 14 and further decreases toward inside of the capacity section 14. Thus, the sintering of the side margin 16 is promoted. The difference between the progress of the sintering of the capacity section 14 and the progress of the sintering of the side margin 16 is suppressed. And, the improving effect of the reliability caused by the adding of the rare earth element is enhanced.

La (lanthanum), Ce (cerium), Pr (praseodymium), Nd (neodymium), Pm (promethium), Sm (samarium), Eu (europium), Gd (gadolinium), Tb (terbium), Dy (dysprosium), Ho (holmium), Y (yttrium), Er (erbium), Tm (thulium), Yb (ytterbium), Lu (lutetium), Sc (scandium) or the like can be used as the rare earth element. Table 1 shows ionic radiuses of rare earth elements of which a valence is 3 and of which a coordination number is 6. Exhibition of Table 1 is "R. D. Shannon, Acta Crystallogr., A32, 751(1976)".

TABLE 1

| | | IONIC RADIUS (Å) | |
| --- | --- | --- | --- |
| | VALENCE | COORDINATION NUMBER IS 6 | COORDINATION NUMBER IS 12 |
| Ba | +2 | | 1.610 |
| Ti | +4 | 0.605 | |
| La | +3 | 1.032 | |
| Ce | +3 | 1.010 | |
| Pr | +3 | 0.990 | |
| Nd | +3 | 0.983 | |
| Pm | +3 | 0.970 | |
| Sm | +3 | 0.958 | |
| Eu | +3 | 0.947 | |
| Gd | +3 | 0.938 | |
| Tb | +3 | 0.923 | |
| Dy | +3 | 0.912 | |
| Ho | +3 | 0.901 | |
| Y | +3 | 0.900 | |
| Er | +3 | 0.890 | |
| Tm | +3 | 0.880 | |
| Yb | +3 | 0.868 | |
| Lu | +3 | 0.861 | |
| Sc | +3 | 0.745 | |

From a viewpoint of suppressing the difference between the progress of the sintering of the capacity section 14 and the progress of the sintering of the side margin 16, it is preferable that a difference between the ionic radius of the first rare earth element of the capacity section 14 having the valence 3 and the ionic radius of the first rare earth element of the side margin 16 having the valence 3 is large. For example, it is preferable that the ratio (the ionic radius of the first rare earth element of the capacity section 14 having the valence 3):(the ionic radius of the first rare earth element of the side margin 16 having the valence 3) is 1:0.999 or less. It is more preferable that the ratio is 1:0.993 or less.

The amount of the rare earth element in the side margin 16 is excessively large, densifying of the side margin 16 may be prevented and the resistance to humidity may be degraded. And so, it is preferable that the amount of the first rare earth element in the side margin 16 has an upper limit. For example, it is preferable that the ratio of the amount of the first rare earth element with respect to the amount of the B site element (for example, Ti in the case of barium titanate) in the side margin 16 is 0.05 or less. It is more preferable that the ratio is 0.03 or less. It is still more preferable that the ratio is 0.015 or less.

On the other hand, from a viewpoint of improving the reliability due to the rare earth element in the side margin 16, it is preferable that the amount of the first rare earth element in the side margin 16 has a lower limit. For example, in the side margin 16, it is preferable that the ratio of the amount of the first rare earth element with respect to the amount of the B site element is 0.001 or more. It is more preferable that the ratio is 0.005 or more. It is still more preferable that the ratio is 0.0095 or more.

It is preferable that the concentration of the first rare earth element in the whole of the side margin 16 is close to the concentration of the first rare earth element in the whole of the capacity section 14. For example, in the embodiment, it is preferable that the ratio of the concentration of the first rare earth element in the whole of the side margin 16 with respect to the concentration of the first rare earth element in the whole of the capacity section 14 is 0.5:1.0 to 1.0:0.5. It is more preferable that the ratio is 0.8:1.0 to 1.0:0.8. It is still more preferable that the ratio is 0.95:1.0 to 1.0:0.95.

The amount of the first rare earth element of the capacity section 14 is excessively large, a dielectric constant of the capacity section 14 may be reduced. And so, it is preferable that the amount of the first rare earth element of the capacity section 14 has an upper limit. For example, it is preferable that the ratio of the amount of the first rare earth element with respect to the amount of the B site element in the capacity section 14 is 0.05 or less. It is more preferable that the ratio is 0.03 or less. It is still more preferable that the ratio is 0.015 or less. On the other hand, when the amount of the first rare earth element of the capacity section 14 is excessively small, sufficient improvement of the lifetime may not be necessarily achieved. And so, it is preferable that the amount of the first rare earth element of the capacity section 14 has a lower limit. For example, in the capacity section 14, it is preferable that the ratio of the amount of the first rare earth element with respect to the amount of the B site element is 0.001 or more. It is more preferable that the ratio is 0.005 or more. It is still more preferable that the ratio is 0.0095 or more.

When the main component ceramic of the capacity section 14 and the side margin 16 is barium titanate, it is preferable that the first rare earth element of the capacity section 14 is such as Dy, Ho or the like and the first rare earth element of the side margin 16 is such as Er, Yb, Lu or the like. The first rare earth element of the capacity section 14 may be Eu. The first rare earth element of the side margin 16 may be Tb, Dy, Ho, Y, Er, Yb or Lu. In this case, the sintering characteristic of the side margin 16 may be improved. And, the side margin 16 can be densified without increasing the firing temperature. Therefore, the grain size of the side margin 16 may be small. And the side margin 16 may be densified. With the structure, the number of grain boundary is large. And, it is possible to enlarge the resistance of the side margin 16 and keep the enlarged resistance. And, it is possible to prevent intrusion of moisture from outside.

The removing of the binder in the capacity section 14 may be delayed more than in the cover layer 13. In this case, the atmosphere in the capacity section 14 may be more reductive than in the cover layer 13. Therefore, the sintering velocity in the capacity section 14 is larger than in the cover layer 13. In this case, sintering and the densifying of the cover layer 13 are not promoted. And, the reliability such as the lifetime characteristic or the resistance to humidity at a high temperature may be degraded.

And so, it is preferable that the ionic radius of a rare earth element having the valence 3 of which an amount is the largest among rare earth elements in the cover layer 13 (a first rare earth element of the cover layer 13) is smaller than the ionic radius of the first rare earth element of the capacity section 14 having the valence 3. In this case, the sintering of the cover layer 13 is promoted. The difference between the progress of the sintering of the capacity section 14 and the progress of the sintering of the cover layer 13 is suppressed. And, the improving effect of the reliability due to the adding of the rare earth element can be enhanced.

From a viewpoint of suppressing the difference between the progress of the sintering of the capacity section 14 and the progress of the sintering of the cover layer 13, it is preferable that a difference between the ionic radius of the first rare earth element of the capacity section 14 having the valence 3 and the ionic radius of the first rare earth element of the cover layer 13 having the valence 3 is large. For example, it is preferable that the ratio (the ionic radius of the first rare earth element of the capacity section 14 having the valence 3):(the ionic radius of the first rare earth element of the cover layer 13 having the valence 3) is 1:0.999 or less. It is more preferable that the ratio is 1:0.993 or less.

The amount of the rare earth element in the cover layer 13 is excessively large, densifying of the cover layer 13 may be prevented and the resistance to humidity may be degraded. And so, it is preferable that the amount of the first rare earth element of the cover layer 13 has an upper limit. For example, in the cover layer 13, it is preferable that the ratio of the amount of the first rare earth element with respect to the amount of the B site element (for example, Ti in the case of barium titanate) is 0.05 or less. It is more preferable that the ratio is 0.03 or less. It is still more preferable that the ratio is 0.015 or less.

On the other hand, from a viewpoint of improving the reliability due to the rare earth element in the cover layer 13, it is preferable that the amount of the first rare earth element of the cover layer 13 has a lower limit. For example, in the cover layer 13, it is preferable that the ratio of the amount of the first rare earth element with respect to the amount of the B site element is 0.001 or more. It is more preferable that the ratio is 0.005 or more. It is still more preferable that the ratio is 0.0095 or more.

It is preferable that the ratio of the concentration of the first rare earth element in the whole of the cover layer 13 with respect to the concentration of the first rare earth element in the whole of the capacity section 14 is 0.5:1.0 to 1.0:0.5. It is more preferable that the ratio is 0.8:1.0 to 1.0:0.8. It is still more preferable that the ratio is 0.95:1.0 to 1.0:0.95.

When the main component ceramic of the capacity section 14 and the cover layer 13 is barium titanate, it is preferable that the first rare earth element of the capacity section 14 is such as Dy, Ho or the like and the first rare earth element of the cover layer 13 is such as Er, Yb, Lu or the like. The first rare earth element of the capacity section 14 may be Eu. The first rare earth element of the cover layer 13 may be Tb, Dy, Ho, Y, Er, Yb or Lu. In this case, the sintering characteristic of the cover layer 13 may be improved. And, the cover layer 13 can be densified without increasing the firing temperature. Therefore, the grain size of the cover layer 13 may be small. And the cover layer 13 may be densified. With the structure, the number of the grain boundary is large. And it is possible to enlarge the resistance of the cover layer 13 and keep the enlarged resistance. And, it is possible to prevent intrusion of moisture from outside.

Figure 8:
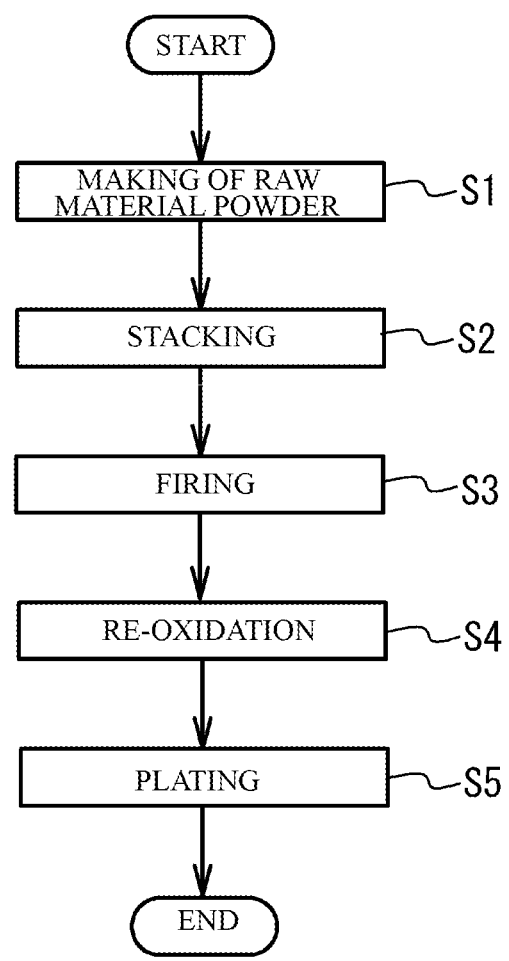
FIG. 8 is a flowchart of a method of manufacturing the multilayer ceramic capacitor.

Next, the manufacturing method of the multilayer ceramic capacitor 100 will be described. FIG. 8 is a flowchart of the manufacturing method of the multilayer ceramic capacitor 100.

[Making of Raw Material Powder (S1)]

A dielectric material for forming the dielectric layer 11 is prepared. The dielectric material includes the main component ceramic of the dielectric layer 11. The A site element and the B site element contained in the dielectric layer 11 are contained in the dielectric layer 11 typically in the form of a sintered compact of $ABO_3$ particles. For example, $BaTiO_3$ is a tetragonal compound having a perovskite structure, and exhibits high dielectric constant. This $BaTiO_3$ can be obtained typically by reacting a titanium raw material such as titanium dioxide with a barium raw material such as barium carbonate to synthesize barium titanate. Various methods have been known as a synthesizing method of ceramic constituting the dielectric layer 11. For example, the solid phase method, the sol-gel method, the hydrothermal method, and the like are known. Any one of the above methods can be employed in the present embodiment.

Additive compound is added to the resulting ceramic powder in accordance with purposes. The additive compound may be an oxide of zirconium (Zr), calcium (Ca), strontium (Sr), magnesium (Mg), manganese (Mn), vanadium (V), chromium (Cr) or a rare earth element, or an oxide of cobalt (Co), Ni, lithium (Li), B (boron), sodium (Na), potassium (K) or Si, or glass.

Next, a margin material for forming the end margin 15 and the side margin 16 is prepared. The margin material includes the main component ceramic of the end margin 15 and the side margin 16. $BaTiO_3$ powder is made as the main component ceramic. It is possible to make the $BaTiO_3$ powder with the same method as that of the dielectric material. Additive compound is added to the ceramic powder of barium titanate obtained through the same process as the making process of the dielectric material described above, in accordance with purposes. The additive compound may be an oxide of Zr, Ca, Sr, Mg, Mn, V, Cr, or a rare-earth element, an oxide of Co, Ni, Li, B, Na, K, or Si, or glass.

Next, a cover material for forming the cover layer 13 is prepared. The cover material includes the main component ceramic of the cover material. $BaTiO_3$ powder is made as the main component ceramic. It is possible to make the $BaTiO_3$ powder with the same method as that of the dielectric material. Additive compound is added to the ceramic powder of barium titanate obtained through the same process as the making process of the dielectric material described above, in accordance with purposes. The additive compound may be an oxide of Zr, Ca, Sr, Mg, Mn, V, Cr, or a rare-earth element, an oxide of Co, Ni, Li, B, Na, K, or Si, or glass. As the cover material, the above-mentioned margin material may be used.

[Stacking Process (S2)]

Next, a binder such as polyvinyl butyral (PVB) resin, an organic solvent such as ethanol or toluene, and a plasticizer are added to the resulting dielectric material and wet-blended. With use of the resulting slurry, a strip-shaped dielectric green sheet 51 with a thickness of, for example, 0.8 μm or less is coated on a base material by, for example, a die coater method or a doctor blade method, and then dried.

Figure 9A:
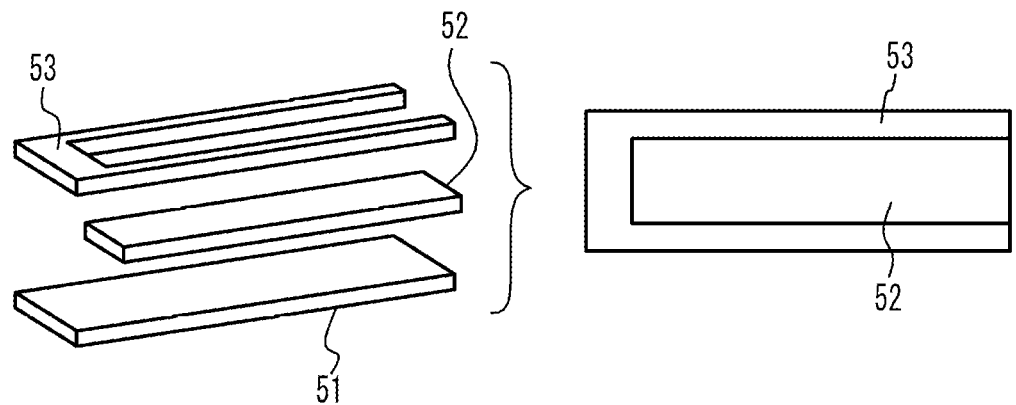
FIG. 9A and FIG. 9B illustrate a stacking process.

Next, as illustrated in FIG. 9A, a first pattern 52 of the internal electrode layer is formed on the surface of the dielectric green sheet 51 by printing a metal conductive paste for forming the internal electrode with use of screen printing or gravure printing. The metal conductive paste for forming the internal electrode contains an organic binder. Ceramic particles are added as a co-material to the metal conductive paste. The main component of the ceramic particles is not particularly limited, but is preferably the same as the main component ceramic of the dielectric layer 11.

Next, a binder such as an ethylcellulose-based binder and an organic solvent such as a terpineol-based solvent are added to the margin material and kneaded to obtain a margin paste of the inverse pattern layer 17. As illustrated in FIG. 9A, a second pattern 53 is formed by printing the margin paste in the peripheral region, where no first pattern 52 is printed, on the dielectric green sheet 51 to cause the second pattern 53 and the first pattern 52 to form a flat surface.

Figure 9B:
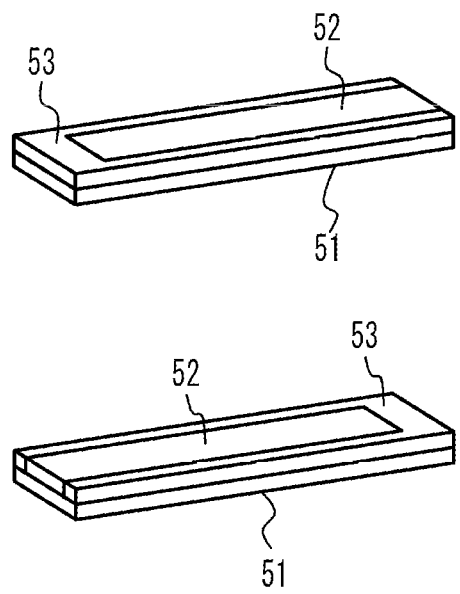

Thereafter, a predetermined number of the stack units (the dielectric green sheet 51, the first pattern 52 and the second pattern 53) are stacked while the base material is peeled so that the internal electrode layers 12 and the dielectric layers 11 are alternated with each other and the end edges of the internal electrode layers 12 are alternately exposed to both edge faces in the length direction of the dielectric layer 11 so as to be alternately led out to a pair of external electrodes of different polarizations as illustrated in FIG. 9B. For example, 100 to 500 stack units are stacked.

Figure 10:
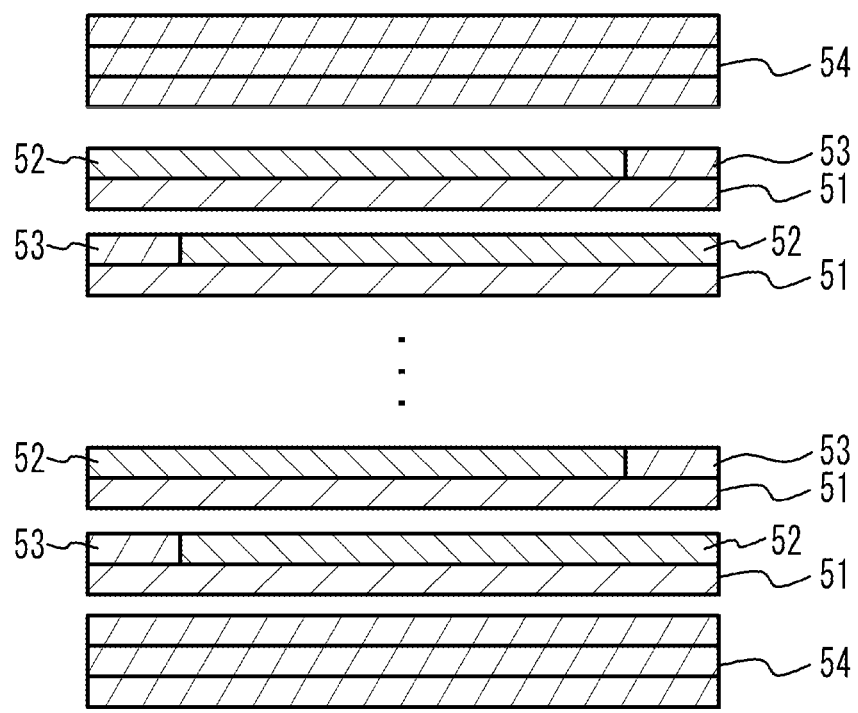
FIG. 10 illustrates a stacking process.
Figure 11:
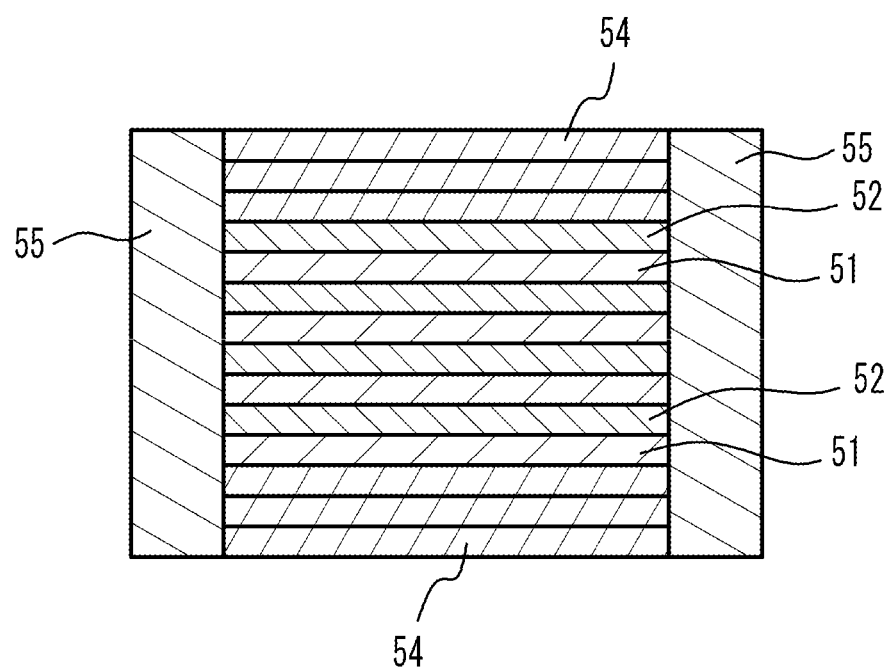
FIG. 11 illustrates a stacking process.

Next, a binder such as polyvinyl butyral (PVB) resin, an organic solvent such as ethanol or toluene, and a plasticizer are added to the resulting cover material and wet-blended. With use of the resulting slurry, a cover sheet 54 with a thickness of, for example, 10 μm or less is coated on a base material by, for example, a die coater method or a doctor blade method, and then dried. As illustrated in FIG. 10, a predetermined number (for example, 2 to 10) cover sheet 54 are stacked on the stacked dielectric green sheets 51 and under the stacked dielectric green sheets 51. After that, the stacked structure is cramped. The resulting stacked structure is stamped into a predetermined size (for example, 1.0 mm×0.5 mm). Both edge faces of the resulting stacked structure are coated with metal conductive paste for the external electrodes 20a and 20b by a dipping method. Then, the metal conductive paste is dried. Thus, a ceramic multilayer structure is obtained. Instead of the method, the predetermined number of cover sheets 54 may be stacked and cramped. After that, the stacked cover sheets 54 may be affixed on the stacked dielectric green sheets 51 and under the stacked dielectric green sheets 51.

In the processes of FIG. 9A to FIG. 10, a section in which the first pattern 52 and a part of the dielectric green sheet 51 corresponding to the first pattern 52 are stacked is an example of the multilayer portion in which the sheets of which a main component ceramic is $BaTiO_3$ particles and patterns of metal conductive paste are alternately stacked. A section in which the second pattern 53 and a part of the dielectric green sheet 51 out of the first pattern 52 are stacked is an example of the side margin section arranged on the wide faces of the multilayer portion.

The side margin section may be affixed to the side faces of the multilayer portion or may be printed on the side faces of the multilayer portion. In concrete, as illustrated in FIG. 1, the dielectric green sheets 51 and the first patterns having the same width as the dielectric green sheets 51 are alternately stacked. Thus, the multilayer portion is formed. Next, a sheet formed of the side margin paste is affixed to the side faces of the multilayer portion. Alternatively, the side margin paste is printed on the side faces of the multilayer portion. Thus, the side margin section may be formed. The margin paste may be used for the side margin paste. A part of the side margin paste formed on the side faces of the multilayer portion in which the dielectric green sheets 51 and the first patterns 52 are stacked corresponds to the side margin section.

In the processes of FIG. 9A to FIG. 11, the amounts of the additives are adjusted in the raw material making process, so that the ionic radius of the first rare earth element of the side margin 16 having the valence 3 is smaller than the ionic radius of the first rare earth element of the capacity section 14 having the valence 3. And, it is preferable that the amounts of the additives are adjusted in the raw material making process, so that the ionic radius of the first rare earth element of the cover layer 13 having the valence 3 is smaller than the ionic radius of the first rare earth element of the capacity section 14 having the valence 3.

[Firing Process (S3)]

The binder is removed from the resulting ceramic multilayer structure in $N_2$ atmosphere. After that, Ni paste to be the base layer of the external electrodes 20a and 20b is painted. The resulting ceramic multilayer structure is fired in a reducing atmosphere with an oxygen partial pressure of $10^{-5}$ to $10^{-8}$ atm in a temperature range of 1100° C. to 1300° C. for 10 minutes to 2 hours. Thus, the multilayer ceramic capacitor 100 is obtained.

[Re-Oxidizing Process (S4)]

Thereafter, the re-oxidizing process is performed in a $N_2$ gas atmosphere in a temperature range of 600° C. to 1000° C.

[Plating Process (S5)]

After that, metal layers such as Cu, Ni, Sn or the like may be formed on the external electrodes 20a and 20b by plating.

In the manufacturing method of the embodiment, the sintering of the side margin 16 is promoted. The difference between the progress of the sintering of the capacity section 14 and the progress of the sintering of the side margin 16 is reduced. And the improvement of the reliability due to adding of the rare earth element is enhanced. The sintering of the cover layer 13 is promoted. The difference between the progress of the sintering of the capacity section 14 and the progress of the sintering of the cover layer 13 is reduced. And the improvement of the reliability due to adding of the rare earth element is enhanced.

In the above embodiment, the multilayer ceramic capacitor has been described as an example of the ceramic electronic component. However, the ceramic electronic component is not limited to the multilayer ceramic capacitor. For example, the ceramic electronic component may be other electronic components such as a varistor and a thermistor.

EXAMPLES

A difference of sintering densifying temperature caused by a difference of ionic radius was confirmed.

Additives were added to barium titanate powder. The resulting barium titanate powder was wet-blended and crushed in a ball mil. Thus, the dielectric material was obtained. Additives were added to barium titanate powder. The resulting barium titanate powder was wet-blended and crushed in a ball mil. Thus, the margin material was obtained. Additives were added to barium titanate powder. The resulting barium titanate powder was wet-blended and crushed in a ball mil. Thus, the cover material was obtained.

A butyral-based material acting as an organic binder, ethanol and toluene acting as a solvent were mixed with the dielectric material. And the dielectric green sheet 51 was made by a doctor blade method. The first pattern 52 was printed on the dielectric green sheet 51. 500 numbers of the dielectric green sheets 51 on which the first pattern 52 was printed were stacked so that each of the first patterns 52 is alternately shifted. A butyral-based material acting as an organic binder, ethanol and toluene acting as a solvent were mixed with the cover material. And the cover sheet 54 was made by a doctor blade method. After that, the cover sheet 54 was stacked on the stacked dielectric green sheets 51. Another cover sheet 54 was stacked under the stacked dielectric green sheets 51. The stacked structure was cramped. Thus, a ceramic multilayer structure was obtained.

The ceramic multilayer was cut so that the cover sheets 54, the dielectric green sheets 51 and the first patterns 52 had the same width. After that, an ethyl cellulose material acting as a binder, and terpineol-based material acting as an organic solvent were mixed with the margin material. The resulting margin material was kneaded by a roll mil. Thus side margin paste was made. A sheet made of the side margin paste was affixed to the two side faces of the ceramic multilayer structure after cutting. After that, the resulting ceramic multilayer structure was fired in a reductive atmosphere of 1200 degrees C.

With respect each type of rare earth elements which was added as the additive, the same processes were repeated and chip samples were made. An amount of pores in the center portion of the side margin 16 of each chip sample was quantified by SEM (Scanning electronic Microscope). The sample chips were polished until the center portion was exposed. The cross section of the center portion was observed by SEM. An area of the side margin 16 and an area of pores in the side margin 16 were measured by using an ImageJ of an image processing software. The ratio of the area of remaining pores with respect to the area of the side margin 16 was a ratio of remaining pores. Each ratio was used for comparing the rare earth elements.

It was determined that the lower the ratio of the remaining pores of the center portion of the side margin 16 was, the more the sintering progressed. When the densifying progressed at the same firing temperature, it was determined that the sintering temperature was reduced, in the determining of the sintering temperature. When the densifying delayed at the same firing temperature, it was determined that the sintering temperature was elevated.

Table 2, Table 3, Table 4 and Table 5 shows the results. In Table 2, it was confirmed whether the sintering densifying temperature was higher or lower than the sintering densifying temperature of a case where Ho was added. As shown in Table 2, when the rare earth element of which the ionic radius was larger than that of Ho was added, the sintering densifying temperature was high. On the other hand, when the rare earth element of which the ionic radius was smaller than that of Ho was added, the sintering densifying temperature was low. In Table 2, the ratio of the ionic radius of each rare earth element with respect to the ionic radius of Ho was shown.

TABLE 2

| | IONIC RADIUS (Å) COORDINATE NUMBER: 6 | IONIC RADIUS RATIO | SINTERING DENSIFYING TEMPERATURE |
|---|---|---|---|
| La | 1.032 | 1.145 | INCREASE |
| Pr | 0.990 | 1.099 | INCREASE |
| Nd | 0.983 | 1.091 | INCREASE |
| Eu | 0.947 | 1.051 | SLIGHTLY INCREASE |
| Gd | 0.938 | 1.041 | SLIGHTLY INCREASE |
| Tb | 0.923 | 1.024 | SLIGHTLY INCREASE |
| Dy | 0.912 | 1.012 | SLIGHTLY INCREASE |
| Ho | 0.901 | 1.000 | STANDARD |
| Y | 0.900 | 0.999 | SLIGHTLY DECREASE |
| Er | 0.890 | 0.988 | SLIGHTLY DECREASE |
| Yb | 0.868 | 0.963 | DECREASE |

In Table 3, it was confirmed whether the sintering densifying temperature was higher or lower than the sintering densifying temperature of a case where Dy was added. As shown in Table 3, when the rare earth element of which the ionic radius was larger than that of Dy was added, the sintering densifying temperature was high. On the other hand, when the rare earth element of which the ionic radius was smaller than that of Dy was added, the sintering densifying temperature was low. In Table 3, the ratio of the ionic radius of each rare earth element with respect to the ionic radius of Dy was shown.

TABLE 3

| | IONIC RADIUS (Å) COORDINATE NUMBER: 6 | IONIC RADIUS RATIO | SINTERING DENSIFYING TEMPERATURE |
|---|---|---|---|
| La | 1.032 | 1.132 | INCREASE |
| Pr | 0.990 | 1.086 | INCREASE |
| Nd | 0.983 | 1.078 | INCREASE |
| Eu | 0.947 | 1.038 | SLIGHTLY INCREASE |
| Gd | 0.938 | 1.029 | SLIGHTLY INCREASE |
| Tb | 0.923 | 1.012 | SLIGHTLY INCREASE |
| Dy | 0.912 | 1.000 | STANDARD |
| Ho | 0.901 | 0.988 | SLIGHTLY DECREASE |
| Y | 0.900 | 0.987 | SLIGHTLY DECREASE |
| Er | 0.890 | 0.976 | SLIGHTLY DECREASE |
| Yb | 0.868 | 0.952 | DECREASE |

TABLE 4

| | IONIC RADIUS (Å) COORDINATE NUMBER: 6 | IONIC RADIUS RATIO | SINTERING DENSIFYING TEMPERATURE |
|---|---|---|---|
| La | 1.032 | 1.090 | INCREASE |
| Pr | 0.990 | 1.045 | SLIGHTLY INCREASE |
| Nd | 0.983 | 1.038 | SLIGHTLY INCREASE |
| Eu | 0.947 | 1.000 | STANDARD |
| Gd | 0.938 | 0.990 | SLIGHTLY DECREASE |
| Tb | 0.923 | 0.975 | SLIGHTLY DECREASE |
| Dy | 0.912 | 0.963 | SLIGHTLY DECREASE |
| Ho | 0.901 | 0.951 | SLIGHTLY DECREASE |
| Y | 0.900 | 0.950 | SLIGHTLY DECREASE |
| Er | 0.890 | 0.940 | SLIGHTLY DECREASE |
| Yb | 0.868 | 0.917 | DECREASE |

TABLE 5

| | IONIC RADIUS (Å) COORDINATE NUMBER: 6 | IONIC RADIUS RATIO | SINTERING DENSIFYING TEMPERATURE |
|---|---|---|---|
| La | 1.032 | 1.000 | STANDARD |
| Pr | 0.990 | 0.959 | SLIGHTLY DECREASE |
| Nd | 0.983 | 0.953 | SLIGHTLY DECREASE |
| Eu | 0.947 | 0.918 | SLIGHTLY DECREASE |
| Gd | 0.938 | 0.909 | SLIGHTLY DECREASE |
| Tb | 0.923 | 0.894 | SLIGHTLY DECREASE |
| Dy | 0.912 | 0.884 | DECREASE |
| Ho | 0.901 | 0.873 | DECREASE |
| Y | 0.900 | 0.872 | DECREASE |
| Er | 0.890 | 0.862 | DECREASE |
| Yb | 0.868 | 0.841 | DECREASE |

In Table 4, it was confirmed whether the sintering densifying temperature was higher or lower than the sintering densifying temperature of a case where Eu was added. As shown in Table 4, when the rare earth element of which the ionic radius was larger than that of Eu was added, the sintering densifying temperature was high. On the other hand, when the rare earth element of which the ionic radius was smaller than that of Eu was added, the sintering densifying temperature was low. In Table 4, the ratio of the ionic radius of each rare earth element with respect to the ionic radius of Eu was shown.

In Table 5, it was confirmed whether the sintering densifying temperature was higher or lower than the sintering densifying temperature of a case where La was added. As shown in Table 5, when the rare earth element of which the ionic radius was larger than that of La was added, the sintering densifying temperature was high. On the other hand, when the rare earth element of which the ionic radius was smaller than that of La was added, the sintering densifying temperature was low. In Table 5, the ratio of the ionic radius of each rare earth element with respect to the ionic radius of La was shown.

From the results of Table 2, Table 3, Table 4 and Table 5, when the rare earth element having a small ionic radius is added, the sintering densifying temperature gets lower.

When the rare earth element having a large ionic radius is added, the sintering densifying temperature gets higher. When the sintering densifying temperature is low, the sintering is promoted. When the sintering densifying temperature is high, the sintering is delayed.

Next, samples of the multilayer ceramic capacitor were made. And characteristic of the samples was measured.

EXAMPLE

Additives were added to barium titanate powder. The resulting barium titanate powder was wet-blended and crushed in a ball mil. Thus, the dielectric material was obtained. Additives were added to barium titanate powder. The resulting barium titanate powder was wet-blended and crushed in a ball mil. Thus, the margin material was obtained. Additives were added to barium titanate powder. The resulting barium titanate powder was wet-blended and crushed in a ball mil. Thus, the cover material was obtained.

A butyral-based material acting as an organic binder, ethanol and toluene acting as a solvent were mixed with the dielectric material. And the dielectric green sheet 51 was made by a doctor blade method. The first pattern 52 was printed on the dielectric green sheet 51. 500 numbers of the dielectric green sheets 51 on which the first pattern 52 was printed were stacked so that each of the first patterns 52 is alternately shifted. A butyral-based material acting as an organic binder, ethanol and toluene acting as a solvent were mixed with the cover material. And the cover sheet 54 was made by a doctor blade method. After that, the cover sheet 54 was stacked on the stacked dielectric green sheets 51. Another cover sheet 54 was stacked under the stacked dielectric green sheets 51. The stacked structure was cramped. Thus, a ceramic multilayer structure was obtained.

The ceramic multilayer was cut so that the cover sheets 54, the dielectric green sheets 51 and the first patterns 52 had the same width. After that, an ethyl cellulose material acting as a binder, and terpineol-based material acting as an organic solvent were mixed with the margin material. The resulting margin material was kneaded by a roll mil. Thus side margin paste was made. A sheet made of the side margin paste was affixed to the two side faces of the ceramic multilayer structure after cutting. After that, the resulting ceramic multilayer structure was fired.

In the example, Ho was added to the dielectric material and Yb was added to the margin material so that (the ionic radius of the first rare earth element of the side margin 16)/(the ionic radius of the first rare earth element of the capacity section 14) was 0.96.

Comparative Example 1

In the comparative example 1, Ho was added to the dielectric material and the margin material so that (the ionic radius of the first rare earth element of the side margin 16)/(the ionic radius of the first rare earth element of the capacity section 14) was 1. Other conditions were the same as those of the example 1.

Comparative Example 2

In the comparative example 2, no rare earth element was added to the margin material. Other conditions were the same as those of the example 1.

(Analysis of relative density) With respect to the example and the comparative examples 1 and 2, a relative density of a center portion of the side margin 16 was measured in a presumption that the relative density without pores was 100%. In the measurement of the relative density, a sample chip was polished until the center portion was exposed. The cross section of the center portion was observed by SEM. An area of the side margin and an area of pores in the side margin were measured in a field of view. The ratio of the area of pores with respect to the area of the side margin was the relative density. The relative density is expressed by the following formula. ImageJ of an image processing software was used.

Total area of pores/area of the side margin (Lifetime characteristic) With respect to the example and the comparative examples 1 and 2, a voltage of 8 V was applied to 100 samples at a temperature of 125 degrees C. And, a time until 50% of the 100 samples were broken was measured. In the condition, when a current of 1 mA or more flowed, the sample was determined as broken.

(Resistance to humidity at a high temperature) With respect to the example and the comparative examples 1 and 2, a voltage of 4 V was applied to 100 samples at a temperature of 85 degrees C. and a relative humidity of 85%. The samples were held under the condition for 17 hours. After that, a direct current resistance was measured by using an insulation resistance meter. When the direct current resistance was 1 MΩ or less, the sample was determined as bad. The number of the samples determined as bad was counted.

Table 6 shows the results. In the comparative example 1, the relative density of a center portion of the side margin 16 in the stacking direction was 94.60% which was a high value. It is thought that this was because the common rare earth element was added to the capacity section 14 and the side margin 16, and the densifying of the side margin 16 was delayed. In the comparative example 1, the resistance to humidity at a high temperature was degraded, and the reliability was degraded. It is thought that this was because the densifying of the side margin 16 was delayed.

TABLE 6

|  | IONIC RADIUS RATIO (SIDE MARGIN / CAPACITY SECTION) | RELATIVE DENSITY | LIFETIME CHARACTERISTIC | RESISTANCE TO HUMIDITY AT HIGH TEMPERATURE |
|---|---|---|---|---|
| EXAMPLE | 0.96 | 98.20% | 321 min | 0.02% |
| COMPARATIVE EXAMPLE 1 | 1 | 94.60% | 328 min | 0.36% |
| COMPARATIVE EXAMPLE 2 | — | 99.40% | 247 min | 0.02% |

In the comparative example 2, the relative density of a center portion of the side margin 16 in the stacking direction was 99.40% which was a high value. It is thought that this was because no rare earth element was added to the side margin 16, and the densifying of the side margin 16 was not delayed. However, the lifetime characteristic was degraded, and the reliability was degraded. It is thought that this was because the rare earth element achieving improvement effect of the reliability was not added to the side margin 16.

On the other hand, in the example, the relative density of a center portion of the side margin 16 in the stacking direction was 98.20% which was high value. The resistance to humidity at a high temperature was favorable. And the reliability was improved. It is thought that this was because the ionic radius of the first rare earth element in the side margin 16 was smaller than the ionic radius of the first rare earth element of the capacity section 14, and the delay of the densifying of the side margin 16 was suppressed. In the example, the lifetime characteristic was favorable. And the reliability was improved. It is thought that this was because the rare earth element achieving improvement of the reliability was added to the side margin 16.

From the above-mentioned results, it was confirmed that the sintering of the side margin 16 was promoted because the ionic radius of the first rare earth element having valence 3 of the side margin 16 was smaller than the ionic radius of the first rare earth element having valence 3 of the capacity section 14. And it was confirmed that the difference between the progress of the sintering of the capacity section 14 and the progress of the sintering of the side margin 16 was suppressed, and the improving effect of the reliability caused by adding of the rare earth element was enhanced.

Although the embodiments of the present invention have been described in detail, it is to be understood that the various change, substitutions, and alterations could be made hereto without departing from the spirit and scope of the invention.

What is claimed is:

1. A ceramic electronic component comprising:
   a multilayer structure having a substantially rectangular parallelepiped shape and including dielectric layers and internal electrode layers that are alternately stacked, the dielectric layers being mainly composed of ceramic, the internal electrode layers being alternately exposed to two edge faces of the multilayer chip opposite to each other,
   wherein a rare earth element of a side margin has an ionic radius smaller than an ionic radius of a rare earth element of a capacity section,
   wherein the rare earth element of the side margin is one of a rare earth element when only one rare earth element is added to the side margin, or a rare earth element with a largest amount when a plurality of rare earth elements are added to the side margin,
   wherein the rare earth element of the capacity section is one of a rare earth element when only one rare earth element is added to the capacity section, or a rare earth element with a largest amount when a plurality of rare earth elements are added to the capacity section,
   wherein the side margin is a section covering edge portions to which the internal electrode layers extend toward two side faces other than the two edge faces, and
   wherein the capacity section is a section in which the internal electrode layers next to each other are exposed to different edge faces of the multilayer structure,
   wherein a ratio (the ionic radius of the rare earth element of the capacity section):(the ionic radius of the rare earth element of the side margin) is 1:0.987 or less.

2. The ceramic electronic component as claimed in claim 1, wherein, in the side margin, a ratio of an amount of the rare earth element of the side margin with respect to an amount of a B site element of the side margin is 0.001 or more and 0.05 or less.

3. The ceramic electronic component as claimed in claim 1, wherein the rare earth element of the side margin is Yb or Lu,
   wherein the rare earth element of the capacity section is Dy or Ho.

4. The ceramic electronic component as claimed in claim 1, wherein the rare earth element of the side margin is Tb, Dy, Ho, Y, Er, Yb, or Lu,
   wherein the rare earth element of the capacity section is Eu.

5. The ceramic electronic component as claimed in claim 1, wherein a main component ceramic of the dielectric layers is barium titanate.

6. The ceramic electronic component as claimed in claim 1, further comprising;
   a cover layer provided on at least one of a top face or a bottom face of the multilayer structure in a stacking direction,
   wherein a rare earth element of the cover layer has an ionic radius smaller than the ionic radius of the rare earth element of the capacity section, and
   wherein the rare earth element of the cover layer is a rare earth element when only the rare earth element is added to the cover layer, or a rare earth element with a largest amount when a plurality of rare earth elements are added to the cover layer.

7. The ceramic electronic component as claimed in claim 1, wherein the rare earth element of the side margin is Y,
   wherein the rare earth element of the capacity section is Dy.

8. The ceramic electronic component as claimed in claim 1, wherein the ratio (the ionic radius of the rare earth element of the capacity section):(the ionic radius of the rare earth element of the side margin) is 1:0.96 or less.

9. The ceramic electronic component as claimed in claim 1,
   wherein, in a vicinity of an interface between the capacity section and the side margin, a concentration of the rare earth element of the capacity section gradually decreases from the capacity section toward the side margin, and further decreases toward outside of the side margin, and
   wherein, in vicinity of the interface, a concentration of the rare earth element of the side margin gradually decreases from the side margin toward the capacity section, and further decreases toward inside of the capacity section.

10. A method of manufacturing a ceramic electronic component, the method comprising:
    preparing a ceramic multilayer structure including a multilayer portion and a side margin section, the multilayer portion having a structure in which sheets including particles of which a main component is ceramic and patterns of metal conductive paste are alternately stacked so that the metal conductive paste is alternately exposed to two edge faces of the multilayer portion, the side margin section being arranged on two side faces of the multilayer portion; and
    firing the ceramic multilayer structure,
    wherein a rare earth element of the side margin section has an ionic radius smaller than an ionic radius of a rare earth element of the multilayer portion,
    wherein the rare earth element of the side margin section is a rare earth element when only the rare earth element is added to the side margin section, or a rare earth element with a largest amount when a plurality of rare earth elements are added to the side margin section, and
    wherein the rare earth element of the multilayer portion is a rare earth element when only the rare earth element is added to the multilayer portion, or a rare earth element with a largest amount when a plurality of rare earth elements are added to the multilayer portion, wherein a ratio (the ionic radius of the rare earth element of the capacity section):(the ionic radius of the rare earth element of the side margin) is 1:0.987 or less.

* * * * *